Sept. 10, 1968   B. H. SNAVELY   3,400,525
FORAGE HARVESTER
Filed Aug. 3, 1965
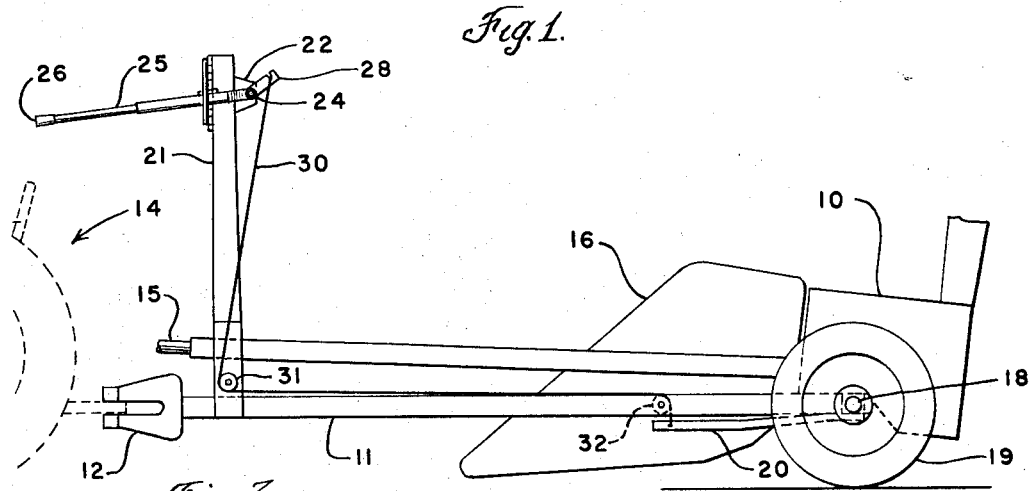
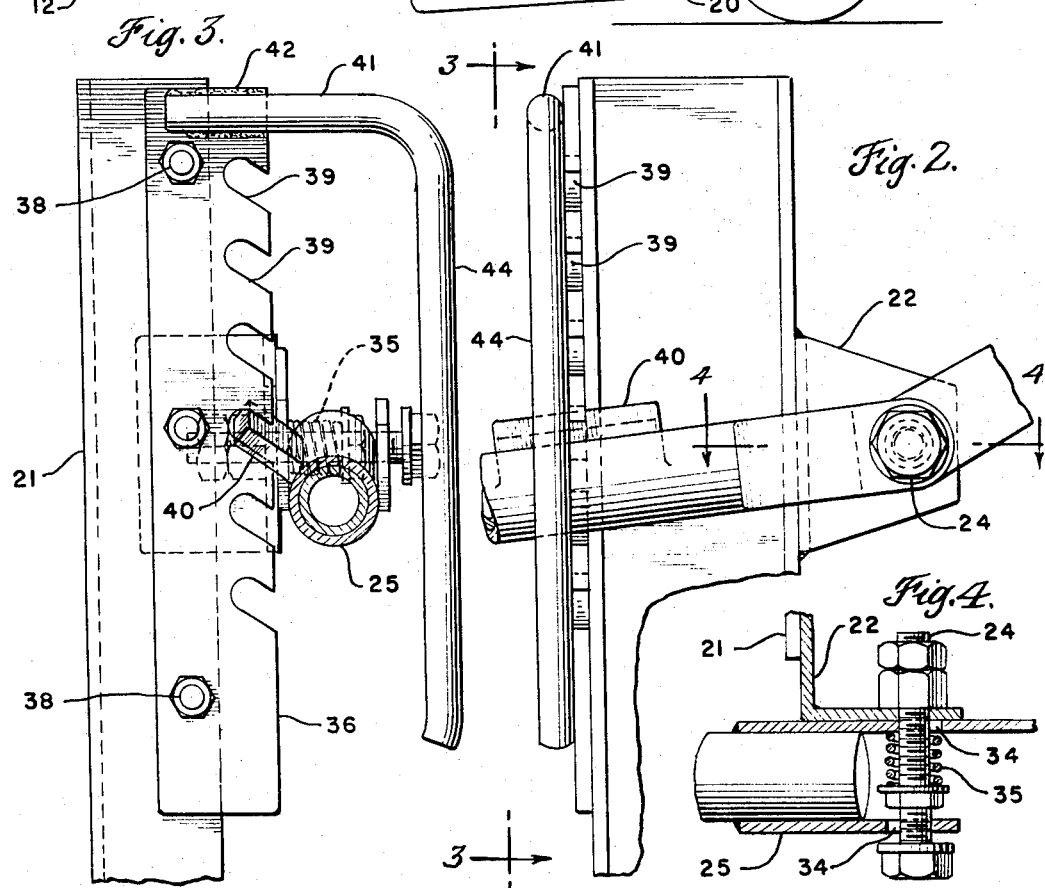
INVENTOR.
BENJAMIN H. SNAVELY
BY Walter V. Wright
AGENT ized Sept. 10, 1968

United States Patent Office 3,400,525
Patented Sept. 10, 1968

3,400,525
FORAGE HARVESTER
Benjamin H. Snavely, New Holland, Pa., assignor to Sperry Rand Corporation, New Holland, Pa., a corporation of Delaware
Filed Aug. 3, 1965, Ser. No. 476,911
3 Claims. (Cl. 56—214)

ABSTRACT OF THE DISCLOSURE

A tractor drawn harvesting implement, having a header unit mounted thereon which is adapted to be selectively vertically adjustable by a tractor operator from his station by means of a lever mounted forwardly of the harvesting implement, within reach of the tractor operator, such that a downward movement of the lever will cause means operatively connected to the lever and the header to raise the header, while upward movement of the lever permits downward movement of the header.

This invention relates generally to tractor drawn harvesting implements. More specifically, it relates to an improved control mechanism by which the operator of a tractor towing a harvesting implement may selectively vertically position the header unit relative to the ground from his position on the tractor.

As is well known in the agricultural machinery art, forage harvester implements comprise a main unit having means to chop crop material into relatively small particles and discharge the chopped material through a discharge spout into a trailing wagon or the like. Various types of header units are removably attachable to the main harvester unit. One type of header unit is employed to gather and deliver row crops such as corn, into the main forage harvester unit; while other different types of header units are employed, with the same main harvester unit, to cut and deliver grass type crops to the main harvester unit. All of the header units have operative positions wherein they extend relatively close to the ground and a transport position wherein they are raised a considerable distance from the ground to facilitate transport to and from the field. The header units have considerable weight and it is no easy task to adjust the unit from a lowered operative position to the raised transport position. It is the practice of manufacturers to provide manually operable control means on the implement for pivotally raising and lowering the header unit. While in many cases, these means are located near the front of the implement where they are reasonably close to the tractor operator, they require a pulling or lifting on the part of the operator to raise the header. Due to the weight of the header and the location of the lever behind the tractor operator, it is extremely difficult and somewhat hazardous to adjust the header position from the operator's seat on the tractor. Rarely can an operator adjust the header with the tractor and implement in motion. It is commonly required that the operator stop the tractor and devote full attention to adjustment of the header. In many fields, the header must be elevated at the end of each row to enable the operator to maneuver the implement into position to harvest the next succeeding row. It is a bothersome, time-consuming operation to stop the harvesting operation at the end of each row, adjust the header for maneuvering, maneuver into position for harvesting the next row, and then stop the tractor again to adjust the header unit prior to beginning the harvesting operation of the next row.

It is an object of this invention to provide improved forage harvester header unit adjusting mechanism.

It is another object of this invention to provide forage harvester header unit adjusting mechanism requiring relatively little physical effort on the part of the operator.

It is another object of this invention to provide forage harvester header unit adjusting mechanism which can readily be operated by the operator of a towing tractor from his operator's station on the tractor.

It is another object of this invention to provide forage harvester header unit adjusting mechanism wherein the weight of the tractor operator may be advantageously employed to adjust the header unit, as opposed to his muscular strength.

It is another object of this invention to provide forage harvester header unit adjusting mechanism by which the header position can be readily adjusted while the tractor and implement are in motion.

It is another object of this invention to provide forage harvester header unit adjusting mechanism wherein the header position can be accurately determined without requiring the operator to divert his eyes or attention rearwardly toward the header.

It is another object of this invention to provide forage harvester header unit adjusting mechanism having easily manually disengageable positive locking means for holding the header unit in any one of a desired plurality of positions.

These and other objects of this invention will be apparent upon reference to the following description and claims taken in conjunction with the accompanying drawings wherein:

FIG. 1 is a semidiagrammatic view of a tractor drawn forage harvester implement provided with header unit position adjustment mechanism constructed in accordance with the principles of the present invention;

FIG. 2 is a fragmentary enlarged side elevational view of a portion of the control mechanism shown in FIG. 1;

FIG. 3 is a fragmentary front elevational view of the mechanism shown in FIG. 2 as viewed from the line 3—3 of FIG. 2; and FIG. 4 is a detail sectional view taken on the line 4—4 of FIG. 2.

Referring now to the drawings in detail, the reference numeral 10 refers to a conventional main forage harvester unit having a forwardly extending draft tongue 11 which carries a draft coupling member 12 at its forward end. The rear portion of a conventional farm tractor is shown in phantom lines in FIG. 1, as indicated by the reference numeral 14. The operating mechanism of the main forage harvester unit is driven by an extension shaft 15 which extends forwardly from the main unit to the tractor and is connected to power take-off means on the tractor, as is well known in the forage harvester art. A header unit 16 is mounted on the forward end of the main harvester unit 10. In the example illustrated in FIG. 1, vertical pivotal adjustment of the header 16 between its lowermost operative position and its uppermost road transport position is accomplished by pivoting the entire forage harvester unit about its axle 18 which carries the ground engageable support wheels 19. In other types of forage harvesters, the header unit 16 may be pivotally mounted on the main harvester unit 10 and vertically adjustable relative thereto about its own pivotal mounting. In any event, lever means, as shown at 20, is carried by the harvester unit and operatively connected to the header for raising and lowering the header 16. In the illustrated embodiment, upward movement of lever 20 about axle 18 raises the header unit upwardly relative to the ground, and to draft tongue 11, while downward movement of lever means 20 relative to axle 18 is accompanied by downward movement of header unit 16 toward the ground.

A support stand 21 is carried by draft tongue 11 at the forward end thereof adjacent draft coupling 12. The support stand extends upwardly from the tongue to a height above the seat of a conventional farm tractor coupled to draft coupling 12. A rigid plate 22 is fixedly attached to the rear side of support stand 21 adjacent its top (see FIG. 2). A pivot member in the form of a bolt 24 is carried by plate 22. A lever 25 is carried by pivot member 24. Lever 25 extends forwardly from pivot 24 and has a forward terminal end 26 disposed within the reach of the operator of the towing tractor. Lever 25 also extends rearwardly of pivot member 24 to a rear terminal end 28 which is disposed considerably closer to pivot 24 than the forward terminal end 26. Thus, lever 25 constitutes a lever of the first category. A cable 30 has one end connected to lever 25 adjacent the rear terminal end thereof. Cable 30 extends downwardly along support stand 21 to a pulley 31 disposed adjacent the bottom of the support stand. From pulley 31, cable 30 extends rearwardly to a pulley 32 journalled on draft tongue 11 above the forwardmost end of lever means 20. Cable 30 has its other end anchored to lever means 20. In FIG. 1 it will be apparent that downward movement of forward terminal end 26 of lever 25 results in upward movement of rear terminal end 28 relative to pivot 24. This, acting through cable 30, exerts an upward pull on lever means 20 to raise header 16. As is well known in the forage harvester art, the weight of the header unit is usually supported in the operative position to some extent by counterbalancing springs (not shown in the present drawings) which allow the header to float along the contour of the ground. Normally, as the header raises, the tension of the counterbalancing springs diminishes and the operator must apply increasing effort to further advance the header upwardly. It will be apparent in FIG. 1 that as the lever 25 moves counterclockwise about pivot 24, the effective length of the portion of lever 25 rearwardly of pivot 24 decreases; thereby increasing the mechanical advantage of lever 25. This compensates for reduced header counterbalancing spring tension as the header is raised. This action is facilitated in the present invention by the upward and rearward angle of the portion of lever 25 rearwardly of pivot 24 relative to the portion of the lever extending forwardly of the pivot. While the forward terminal end 26 of the lever 25 moves substantially vertically downwardly, the rear terminal end 28 (and the point of connection of cable 30 thereto) has a forward component of movement which carries it closer to a transverse vertical plane through pivot 24. It is this angular configuration of lever 25 which causes a progressive increase in the mechanical advantage of lever 25 as the header progressively raises.

Referring primarily to FIG. 4, it may be seen that lever pivot member 24 extends through slot means 34 in lever 25. The slot means 34 are elongated along the length of lever 25 a distance greater than the diameter of pivot member 24. This enables lever 25 to be oscillated a limited distance laterally, relative to the direction of travel of the implement, on pivot member 24 as well as being vertically pivotal thereabout. A coil spring 35 is carried by pivot member 24 and engages lever 25 to bias the lever laterally toward support stand 21. In FIG. 3 it may be seen that a vertical latch plate 36 is fixedly attached by bolts 38 to support stand 21 along one side of lever 25. A vertical series of downwardly and laterally opening notches 39 are provided in the lateral edge of plate 36 facing lever 25. An upwardly and laterally inclined detent 40 is rigidly carried by lever 25 and selectively engageable in any one of the notches 39. Engagement and disengagement of detent 40 relative to notches 39 is effected by the operator by moving the forward terminal end of lever 25 laterally away from plate 36. A stop bar 41 is welded at 42 to the uppermost end of latch plate 36. Bar 41 extends laterally across the path of lever 25 and has a downturned end portion 44 extending downwardly along the side of lever 25 opposite that of latch plate 36.

In operation, the first order lever 25 is disposed in a position where the tractor operator can locate forward terminal end 26 quite easily without diverting his attention from the operation of the tractor. The normal operating position of the lever can be readily located to accommodate individual operators by increasing or decreasing the effective length of cable 30. Having grasped the forward terminal end 26 of lever 25, the operator merely leans on lever 25 pivoting it downwardly under the influence of his weight, to raise rear terminal end 28, and the header 16 therewith. The mechanical advantage of lever 25 is such that the weight of the operator readily effects elevation of the header. As the detent 40 moves downwardly along notches 39, the clicking sound accompanying passage of the detent past each successive notch 39 informs the operator audibly of the vertical position of the header as well as enabling him to "feel" the header position. Upon release of lever 25 by the operator, the spring 35 forces detent 40 laterally into the particular notch 39 with which it is aligned. The downturned end portion 44 of stop bar 41 provides the operator with a vertical guide for allowing the lever 25 to drop header 16. The operator merely moves lever 25 laterally against the downturned portion 44 of stop bar 41 to disengage detent 40 from notches 39. The lever 25 is then allowed to slide upwardly along portion 44 of stop bar 41 until it engages the horizontal portion of bar 41. Following this, a slight downward force on lever 25 brings detent 40 into engagement with the uppermost notch 39. Should the operator desire to harvest with the header in a semielevated position, he merely leans on the forward terminal end of lever 25 to move detent 40 downwardly over a corresponding number of notches 39. All header raising operations are effected by leaning downwardly on the forward end of lever 25, while header lowering operations are performed by allowing the weight of header 16 to return lever 25 to its upper position under the control of the weight of the operator. The leverage afforded by the first category lever 25 affords the operator complete and relatively effortless control of the header position.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. On a tractor drawn harvesting implement having a header unit mounted thereon for vertical adjustment about a horizontal pivot axis and a draft tongue extending forwardly from the implement and having a draft coupling at its forwardmost end connectable to the rear of a towing tractor, improved means by which the tractor operator may selectively vertically adjust said header unit from the operator's station on the tractor comprising, lever means horizontally pivotally mounted on said harvesting implement and operatively connected to said header unit to raise said unit in response to movement of said lever means in one direction and to permit said header unit to lower in response to vertical movement of said lever means in the opposite direction, a support stand mounted on said draft tongue at the front end thereof adjacent said draft coupling and extending upwardly from said tongue, a pivot member carried by said support stand adjacent the upper end thereof, a lever horizontally fulcrumed, on said pivot member, said lever having a generally horizontal normal position disposed forwardly from said pivot member and having a forward terminal end wthin reach of the operator of a tractor coupled to said draft coupling, said lever extending angularly rearwardly from said pivot member and having a rear terminal end disposed substantially closer to said pivot member than said forward terminal end, a flexible member interconnected between said lever means on said implement and said angularly rearwardly extending portion of said lever whereby the tractor operator may effect upward movement of said rear terminal end of said lever by applying his body weight downwardly on said forward terminal end, and coacting latch means on said lever and said support stand interengageable to lock said lever in any one of a plurality of angular positions relative to said pivot member.

2. A push down control lever on a harvesting implement for adjustment as recited in claim 1 wherein, said pivot member extends horizontally transverse to the direction of travel of said implement, said lever having slot means transversely therethrough through which said pivot member extends to fulcrum said lever on said support stand, said slot means being of greater size along the length of said lever than said pivot member whereby said lever is movable a limited distance laterally relative to said pivot member in addition to being vertically pivotal about said pivot member, spring means carried by said pivot member and engaging said lever to bias said lever laterally along said pivot member toward said support stand, said coating latch means on said lever and said support stand comprising a vertically disposed plate fixedly attached to said support stand and extending both above and below said pivot member, said plate having a vertically extending series of downwardly and laterally opening notches formed therein, an upwardly and laterally extending detent fixedly carried by said lever and engageable in said notches, said spring means urging said lever laterally to normally engage said detent in said notches, and said detent being disengageable from said notches upon manual movement of said lever laterally relative to said pivot member.

3. A push down control lever on a harvesting implement for header adjustment as recited in claim 2 wherein, said plate lies along one side of said lever, and a stop bar is fixedly attached to said plate above the uppermost notch of said vertically extending series of notches, said stop bar extending transversely across the vertical path of movement of said lever and having a downturned end portion lying along the side of said lever opposite said one side, whereby said bar positively limits both the lateral and vertical extent of movement of said lever relative to said pivot member.

References Cited
UNITED STATES PATENTS

| | | | |
|---|---|---|---|
| 2,195,338 | 3/1940 | Neumann et al. | 74—533 |
| 2,836,952 | 6/1958 | Hume | 56—208 X |
| 2,894,411 | 7/1959 | Roscoe et al. | 74—533 X |

ANTONIO F. GUIDA, *Primary Examiner.*